(12) United States Patent
Kompella et al.

(10) Patent No.: US 7,937,492 B1
(45) Date of Patent: May 3, 2011

(54) LSP PING AND TRACEROUTE FOR BYPASS TUNNELS

(75) Inventors: Kireeti Kompella, Los Altos, CA (US); Nitin Bahadur, San Francisco, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 288 days.

(21) Appl. No.: 12/241,158

(22) Filed: Sep. 30, 2008

(51) Int. Cl.
*G06F 15/173* (2006.01)
*H04L 12/28* (2006.01)

(52) U.S. Cl. ........ 709/239; 709/242; 370/351; 370/353; 370/389

(58) Field of Classification Search .................. 709/239, 709/242; 370/351, 353, 389
See application file for complete search history.

(56) References Cited

U.S. PATENT DOCUMENTS

| | | | |
|---|---|---|---|
| 7,397,795 B2 * | 7/2008 | Liu et al. | 370/389 |
| 7,469,282 B2 * | 12/2008 | Taylor et al. | 709/223 |
| 7,590,048 B2 * | 9/2009 | Doukai | 370/217 |
| 7,746,796 B2 * | 6/2010 | Swallow et al. | 370/249 |
| 7,782,847 B2 * | 8/2010 | Hua et al. | 370/389 |
| 7,849,215 B2 * | 12/2010 | Csaszar et al. | 709/242 |
| 2001/0033574 A1 * | 10/2001 | Enoki et al. | 370/396 |
| 2003/0063613 A1 * | 4/2003 | Carpini et al. | 370/401 |
| 2003/0110287 A1 * | 6/2003 | Mattson | 709/238 |
| 2003/0112749 A1 * | 6/2003 | Hassink et al. | 370/225 |
| 2005/0271060 A1 * | 12/2005 | Kodialam et al. | 370/394 |
| 2005/0281192 A1 * | 12/2005 | Nadeau et al. | 370/217 |
| 2006/0198321 A1 * | 9/2006 | Nadeau et al. | 370/254 |
| 2007/0011284 A1 * | 1/2007 | Le Roux et al. | 709/223 |
| 2008/0080507 A1 * | 4/2008 | Swallow et al. | 370/392 |
| 2008/0095061 A1 * | 4/2008 | Hua et al. | 370/248 |
| 2008/0192762 A1 * | 8/2008 | Kompella et al. | 370/410 |
| 2008/0304494 A1 * | 12/2008 | Yokoyama | 370/400 |
| 2009/0175274 A1 * | 7/2009 | Aggarwal et al. | 370/390 |

\* cited by examiner

*Primary Examiner* — Krisna Lim
(74) *Attorney, Agent, or Firm* — Harrity & Harrity, LLP

(57) ABSTRACT

A method performed by a network device may include assembling a multiprotocol label switching (MPLS) echo request, the echo request including an instruction for a transit node to forward the echo request via a bypass path associated with the transit node, and an instruction for an egress node to send an echo reply indicating that the echo request was received on the bypass path. The method may also include sending the MPLS echo request over a functioning label switched path (LSP).

22 Claims, 7 Drawing Sheets

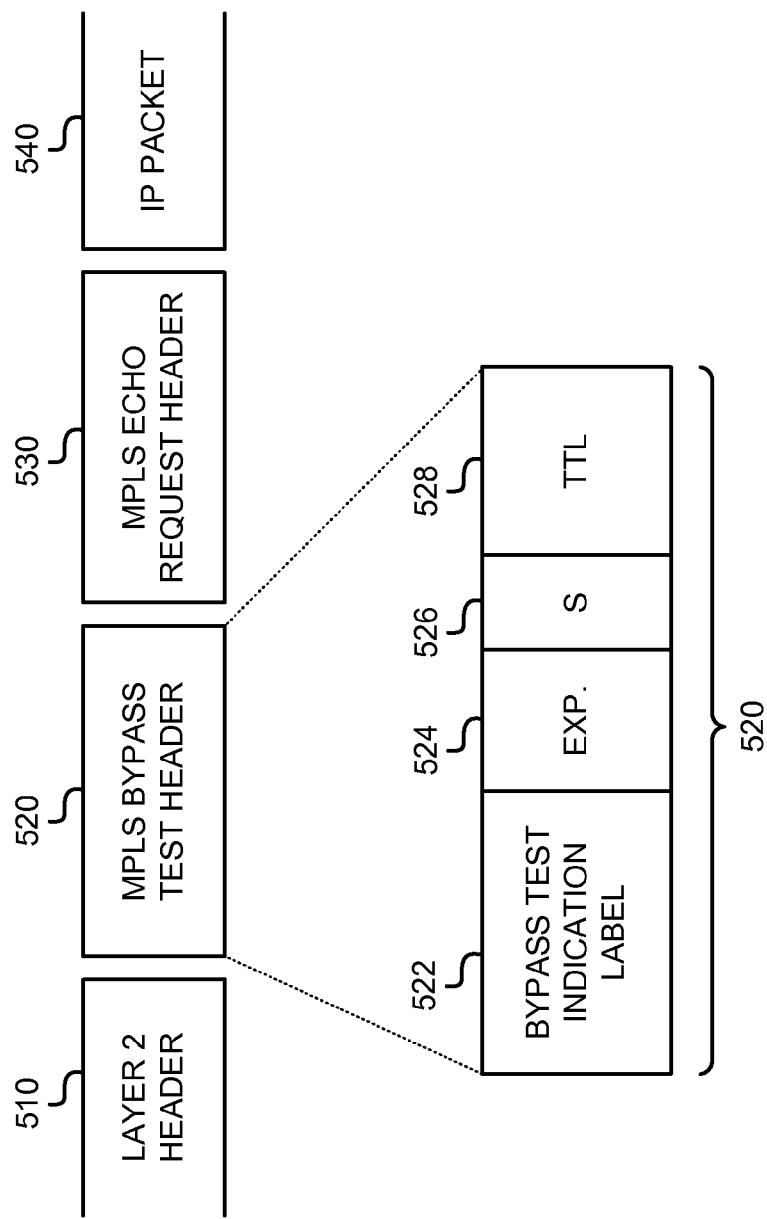

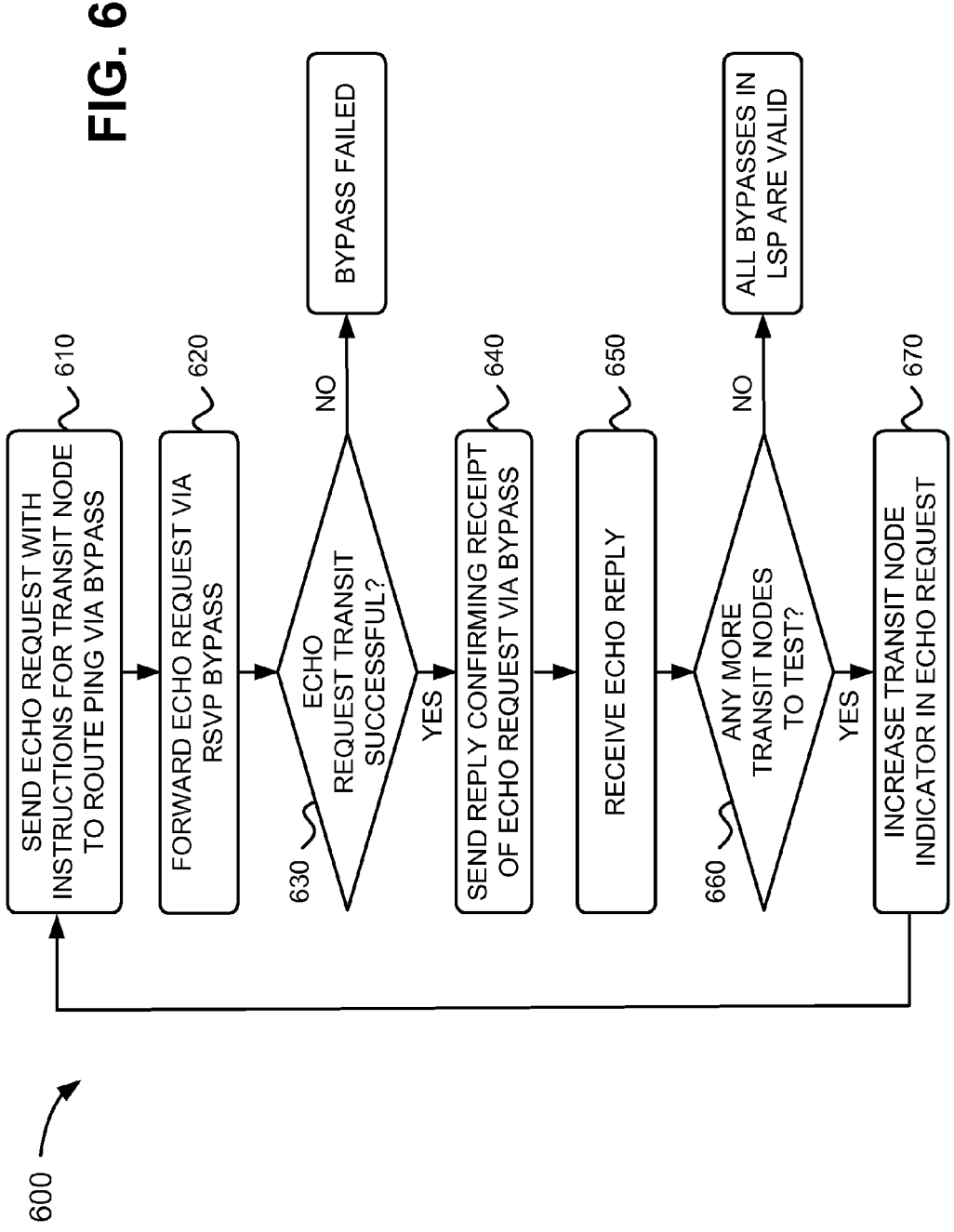

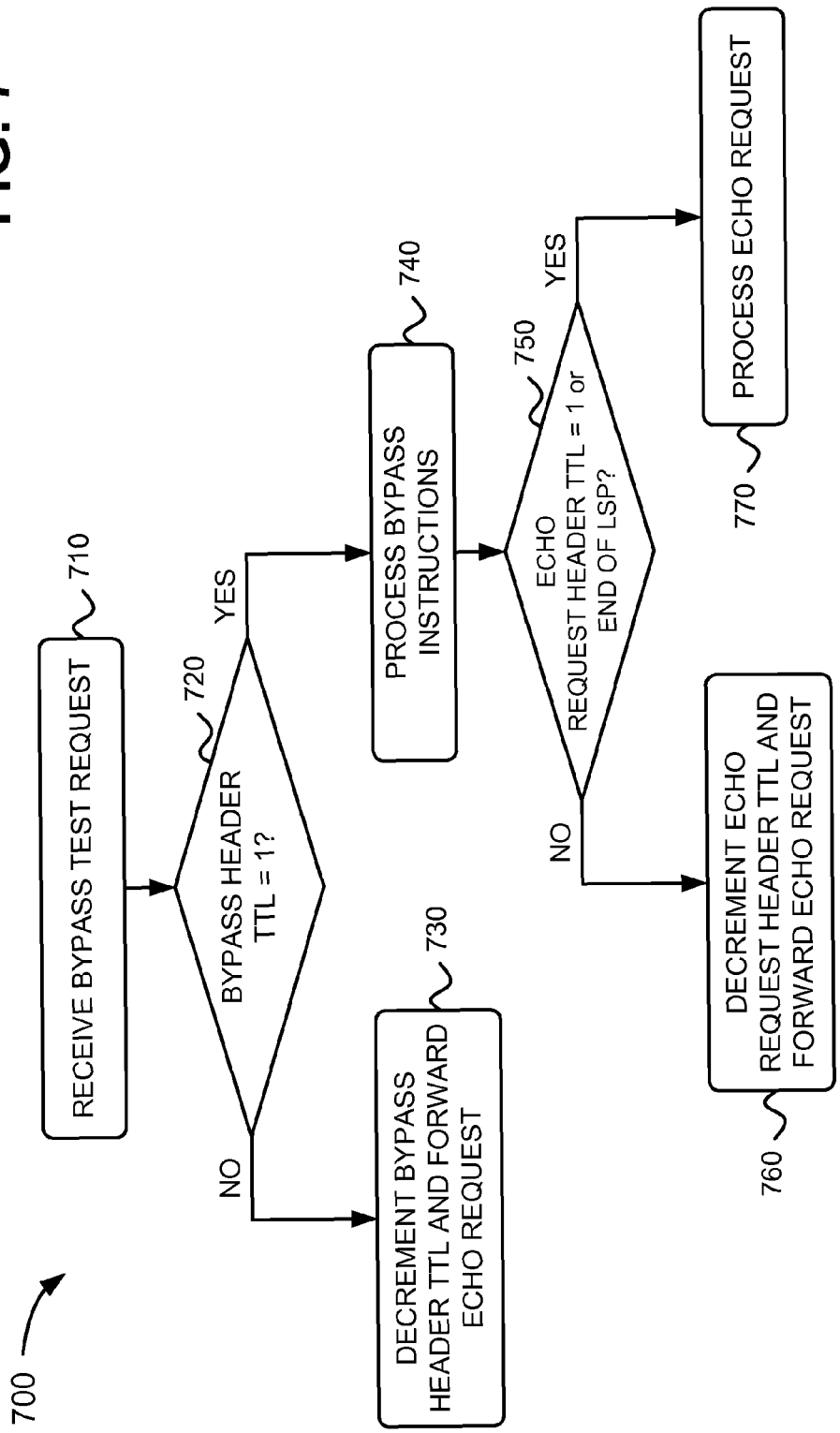

LSP PING AND TRACEROUTE FOR BYPASS TUNNELS

BACKGROUND

In a multiprotocol label switching (MPLS) network, a signaling protocol may be used to set up a label switched path (LSP) in the MPLS network. MPLS may permit a network to direct a flow of packets along a predetermined path (e.g., a LSP) across the network. As part of setting up the LSP, label switching routers (LSRs) included in the MPLS network may set up a label information base (LIB) that maps an incoming label from an input port of the LSR to an output port of the LSR and to a new label value. The LSRs may forward packets along links through the MPLS network based on labels attached to the packets that indicate which LSP to use. The label may be swapped to the new label at each router hop. In this way, a LSP may identify the specific path of nodes (e.g., routers) and links that the packets take through the MPLS network.

Resource reservation protocol (RSVP) may be used to reserve resources across a network. RSVP may be used by either a host or a router to request or deliver specific qualities of services (QoS) for application data streams or flows. RSVP may define how applications place reservations and how they may relinquish the reserved resources once the need for them has ended. In RSVP LSPs, various protection mechanisms can be used to protect against link and node failures. These failure mechanisms may construct a bypass tunnel across a protected link/node. Generally, the bypass tunnel gets used only in case of failure.

Software utilities, such as LSP ping and LSP traceroute utilities, are useful tools for identifying failed connectivity between two nodes in an MPLS network. These tools typically require a user to enter a unique identifier, such as a particular internet protocol (IP) address, of a remote host in order to test the connectivity to that remote host over an LSP. For example, an LSP ping may test connectivity to a remote host by sending an MPLS echo request packet to a specific IP address to test the status of connectivity to a particular target device having the IP address. If an echo reply packet is not received within a defined time period, connectivity to that device is assumed to be down.

Similarly, an LSP trace may require an IP address for a target device in order to test connectivity from the source device to that target device. The LSP traceroute utility may test connectivity to the remote target device by tracing an MPLS echo request packet's path from the source device to the particular IP address specified by the user. As output, the LSP trace may show how many hops the packet traveled to reach the IP address, identify each hop by its IP address, and show the amount of time each hop took.

SUMMARY

A method performed by a network device may include assembling a multiprotocol label switching (MPLS) echo request, the echo request including an instruction for a transit node to send the echo request via a bypass path associated with the transit node, and an instruction for an egress node to send an echo reply indicating that the request was received on the bypass path.

A network device may include a control unit to assemble MPLS echo requests, each of the echo requests including an instruction for a separate transit node in a functional LSP to send the echo request via a bypass path associated with the transit node and an instruction for an egress node to send an echo reply that indicates that the echo request was received via the bypass path. The device may also include an output port to send the echo requests over the LSP.

A method performed by a network device may include receiving an MPLS echo request including an instruction to forward the echo request via a bypass path in a functioning LSP. The method may also include evaluating a MPLS header in the echo request to determine if the instruction to send the echo request via the bypass path is intended for the network device. The method may further include forwarding the echo request via the bypass path associated with the network device.

A network device may include means for receiving a packet from an ingress node over a functioning LSP, the packet including an echo request. The network device may also include means for evaluating an MPLS header in the echo request to determine if the echo request includes instructions intended for the network device. The network device may further include means for forwarding the echo request via a bypass path associated with the network device; and means for sending an echo reply to the ingress node, the reply indicating that the packet including the echo request was received via the bypass path.

A method may include assembling an MPLS echo request, the echo request including an instruction for a transit node to send the echo request via a bypass path associated with the transit node, and an instruction for an egress node to send an echo reply. The method may also include sending the MPLS echo request over a functioning LSP and receiving the MPLS echo request at a transit node along the functioning LSP. The method may further include evaluating the MPLS echo request to determine if the instruction to send the MPLS echo request via the bypass path is intended for the transit node and forwarding the MPLS echo request via the bypass path associated with the transit node. The method may also include receiving the MPLS echo request at the egress node; and sending an echo reply to the ingress node based on the MPLS echo request.

A method may include assembling multiple multiprotocol label switching (MPLS) echo requests, each echo request intended for a different transit node, each of the MPLS echo requests including an instruction for the transit node to send the echo request via a bypass path associated with the transit node and an instruction for an egress node to send an echo reply; and sending the MPLS echo request over a functioning label switched path (LSP).

BRIEF DESCRIPTION OF THE DRAWINGS

The accompanying drawings, which are incorporated in and constitute a part of this specification, illustrate one or more embodiments described herein and, together with the description, explain these embodiments. In the drawings:

FIG. 5 is a block diagram illustrating an exemplary datagram format for use in testing a bypass for an RSVP LSP;

FIG. 6 is a flowchart of an exemplary process for using a ping protocol to test a bypass for an RSVP LSP; and FIG. 7 is a flowchart of an exemplary process for using a trace protocol to test a bypass for an RSVP LSP.

DETAILED DESCRIPTION

The following detailed description refers to the accompanying drawings. The same reference numbers in different drawings may identify the same or similar elements. Also, the following detailed description does not limit the invention.

Systems and methods described herein may use label switched path (LSP) ping and LSP trace mechanisms for evaluating bypass paths, such as resource reservation protocol (RSVP) tunnels, for an LSP in a multiprotocol label switching (MPLS) network. Each bypass path may provide a failure mechanism across a protected link and/or node in the LSP. Generally, the bypass path will be used only in case of failure of the protected link and/or node. Thus, in a normal LSP scenario, there is no way for the ingress of an LSP to know if the bypass paths are working prior to a failure in the LSP. The systems and methods described herein may assemble MPLS echo request that instructs a transit node to send the echo request via a bypass path associated with the transit node and instructs an egress node to send an echo reply indicating successful transmission over the bypass path.

Exemplary Network Overview

Figure 1:
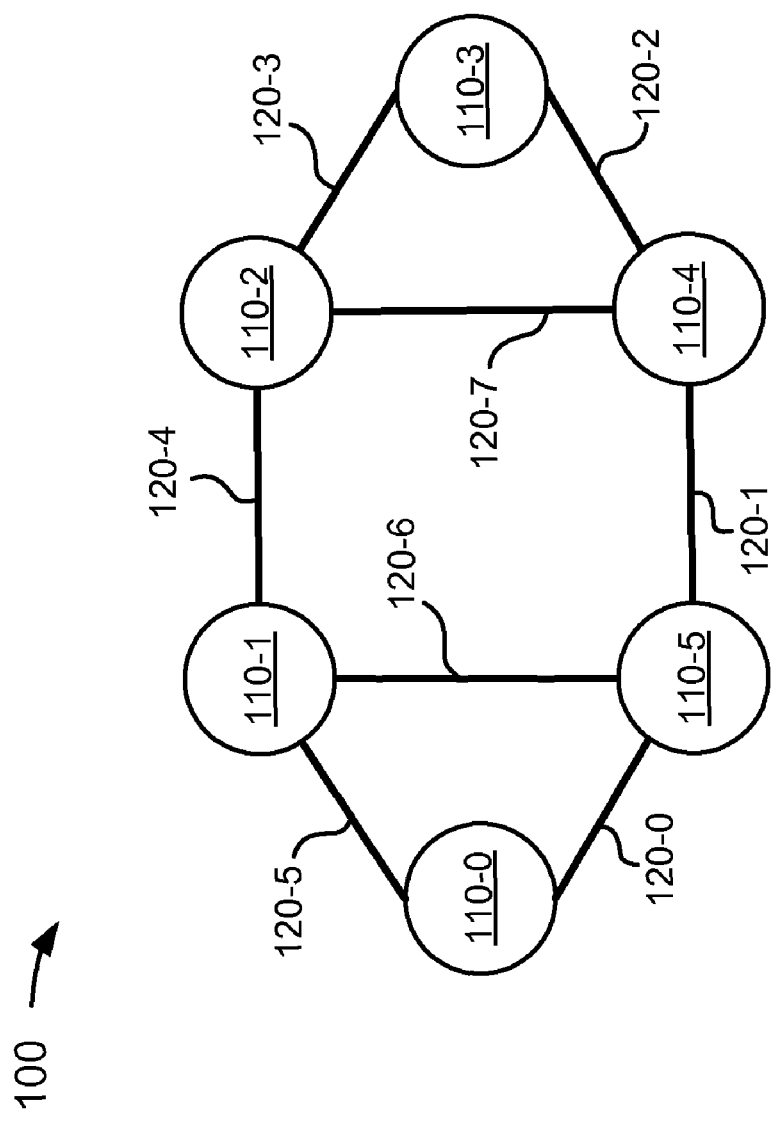
FIG. 1 is a diagram illustrating an exemplary network in which systems and methods described herein may be implemented.

FIG. 1 is a diagram illustrating an exemplary network 100 in which systems and methods described herein may be implemented. In one implementation, network 100 may include, for example, a local area network (LAN)), a private network (e.g., a company intranet), a wide area network (WAN), or another type of network.

As shown in FIG. 1, network 100 may include network devices or nodes 110-0, 110-1, . . . , 110-5 (collectively referred to as network devices 110, or generically as network device 110) interconnected by links 120-0, 120-1, . . . , 120-7 (collectively referred to as links 120, or generically as link 120). While six network devices 110 and eight links 120 are shown in FIG. 1, more or fewer network devices 110 and/or links 120 may be used in other implementations. Network 100 may also include other components, devices, etc. (not shown in FIG. 1).

Network device 110 may include any network device, such as a computer, a router (e.g., a label switching router (LSR)), a switch, a network interface card (NIC), a hub, a bridge, etc. Link 120 may include a path that permits communication among network devices 110, such as wired and/or wireless connections.

For the discussion to follow, assume that network 100 is a MPLS network, network device 110-0 is an ingress LSR (or entry point for a datagram), and network device 110-3 is an egress LSR (or exit point of a datagram) in network 100. A "datagram" may include any type or form of data, such as packet or non-packet data. Depending on the LSP selected, any of network devices 110-1, 110-2, 110-4, 110-5 may serve as transit nodes for the LSP between the ingress LSR 110-0 and the egress LSR 110-3.

Ingress LSR 110-0 may receive a datagram, and may classify the datagram based on a variety of factors into a forwarding equivalent class (FEC). An FEC may include a set of datagrams that may be treated the same for forwarding purposes and may be mapped to a single label. A datagram may be encapsulated in a MPLS shim header that may contain a short, fixed-length locally-assigned label that may be based on the FEC.

Ingress LSR 110-0 may forward a datagram with the MPLS shim header to the next-hop LSR, (e.g., to network device 110-1 or 110-5 in the example of FIG. 1). Each LSR along a LSP may make a forwarding decision based on the label carried in the MPLS shim header and may not make such a decision based on the destination address carried in a network layer header of the datagram. The datagram forwarding process may be based on the concept of label switching. In this way, a LSP may identify the specific path of network devices 110 and links 120 that a datagram(s) takes through MPLS network 100. The labeled datagram may be forwarded along the LSP by each LSR until the datagram eventually arrives at egress LSR 110-3. The MPLS shim header may be removed from the datagram by either egress LSR 110-3 or by the LSR preceding egress LSR 110-3 (e.g., by network device 110-2 or 110-4 in the example of FIG. 1). If required, egress LSR 110-3 may make a forwarding decision for the datagram based on the destination address carried in the network layer header of the datagram.

Using RSVP protocols, particular network devices 110 and/or links 120 within network 100 may be protected against link and/or node failures by constructing a bypass tunnel across the protected network device 110 and/or link 120. A bypass tunnel may be statically configured for each network device 110 and/or link 120 that is being protected on each network device 110 in the LSP.

Exemplary Network Device Configuration

Figure 2:
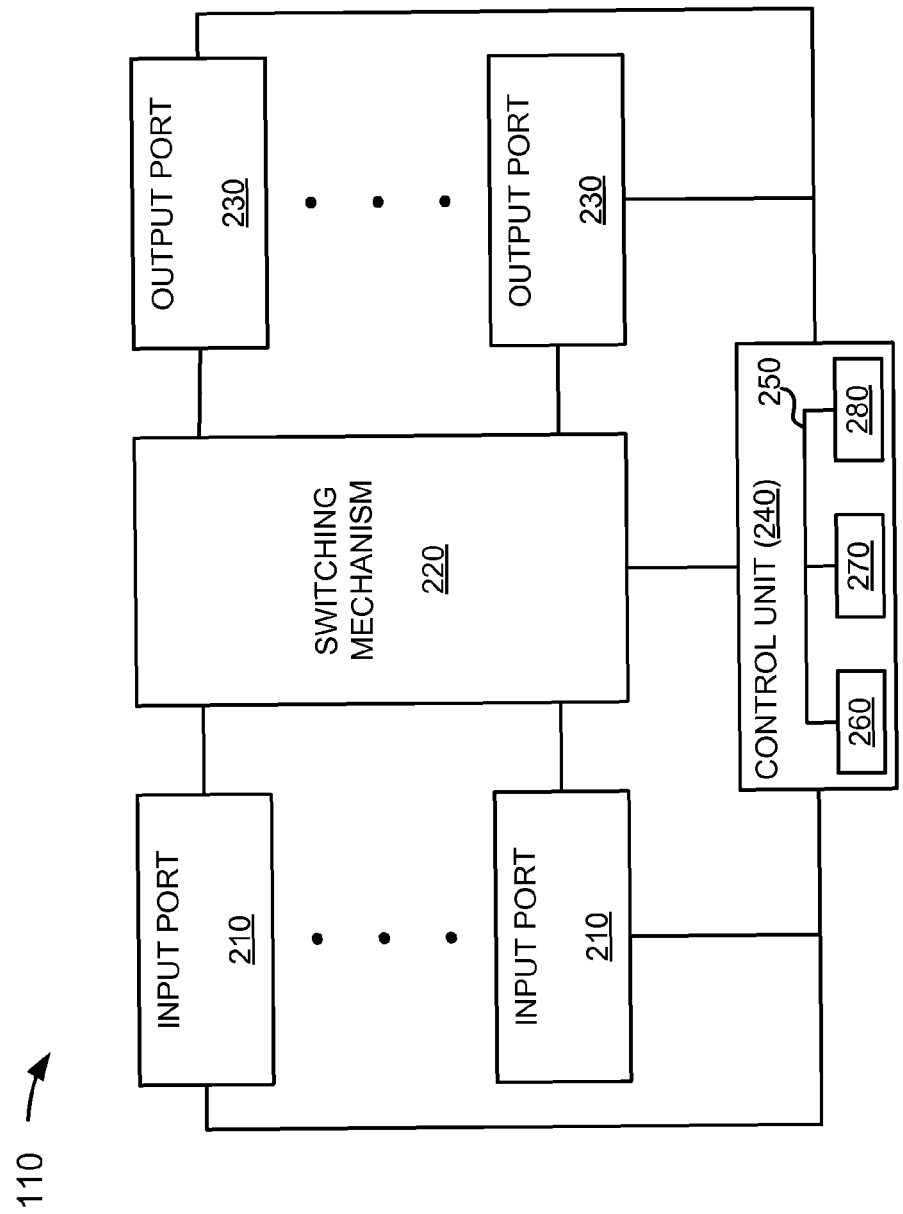
FIG. 2 is a diagram of an exemplary device that may correspond to a node of FIG. 1 according to an exemplary implementation.

FIG. 2 is a diagram of an exemplary device that may correspond to one of network devices 110 of FIG. 1. The device 110 may include input ports 210, a switching mechanism 220, output ports 230, and a control unit 240. Each of the input ports 210 may connect to a physical link (e.g., link 120) (not shown) and may be the point of entry for incoming datagrams. Switching mechanism 220 may interconnect input ports 210 with output ports 230. Each of output ports 230 may store datagrams and may schedule datagrams for service on a physical link (e.g., link 120) (not shown). Control unit 240 may participate in routing protocols and may create a forwarding table that is used in datagram forwarding.

Input ports 210 may carry out datalink layer encapsulation and decapsulation. Input ports 210 may look up a destination address of an incoming datagram in a forwarding table to determine its destination port (i.e., route lookup). In order to provide QoS guarantees, input ports 210 may classify datagrams into predefined service classes. Input ports 210 may run datalink-level protocols or network-level protocols.

Switching mechanism 220 may be implemented using many different techniques. For example, switching mechanism 220 may include one or more busses, crossbars, and/or shared memories. The simplest switching mechanism 220 may be a bus that links input ports 210 and output ports 230. A crossbar may provide multiple simultaneous data paths through switching mechanism 220. In a shared-memory switching mechanism 220, incoming datagrams may be stored in a shared memory and pointers to datagrams may be sent from input ports 210 to output ports 230.

Output ports 230 may store datagrams before the datagrams are transmitted on an output link (e.g., link 120). Output ports 230 may include scheduling algorithms that support priorities and guarantees. Output ports 230 may support datalink layer encapsulation and decapsulation, and/or a variety of higher-level protocols.

Control unit 240 may interconnect with input ports 210, switching mechanism 220, and output ports 230. Control unit 240 may compute a forwarding table, implement routing protocols, and/or run software to configure and manage network device 110. Control unit 240 may process any datagram whose destination address may not be found in the forwarding table.

In one implementation, control unit 240 may include a bus 250 that may include a path that permits communication among a processor 260, a memory 270, and a communication interface 280. Processor 260 may include a microprocessor or processing logic that may interpret and execute instructions. Memory 270 may include a random access memory (RAM), a read only memory (ROM) device, a magnetic and/or optical recording medium and its corresponding drive, and/or another type of static and/or dynamic storage device that may store information and instructions for execution by the processor. Communication interface 280 may include any transceiver-like mechanism that enables control unit 240 to communicate with other devices and/or systems.

Network device 110, as described herein, may perform certain operations, as described in detail below. Network device 110 may perform these operations in response to processor 260 executing software instructions contained in a computer-readable medium, such as memory 270. A computer-readable medium may be defined as a physical or logical memory device.

The software instructions may be read into memory 270 from another computer-readable medium, such as a data storage device, or from another device via communication interface 280. The software instructions contained in memory 270 may cause processor 260 to perform processes that will be described later. Alternatively, hardwired circuitry may be used in place of or in combination with software instructions to implement processes described herein. Thus, implementations described herein are not limited to any specific combination of hardware circuitry and software.

Figure 3:
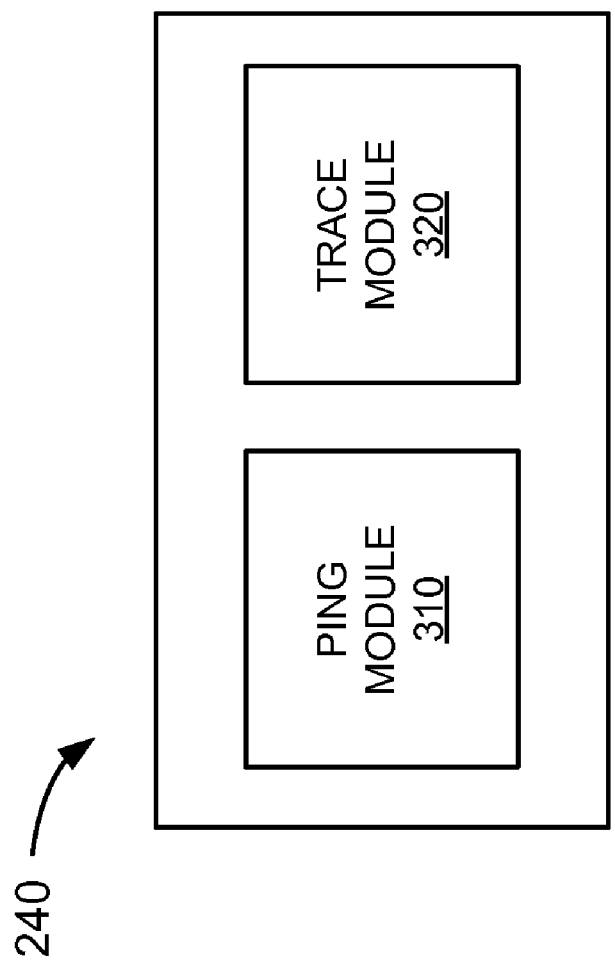
FIG. 3 is a functional block diagram of the control unit of FIG. 2.

FIG. 3 provides an exemplary functional block diagram of control unit 240. Control unit 240 may include one or more diagnostic tools, including a ping module 310 and a trace module 320. In other implementations, control unit 240 may include fewer, additional, or different types of functional components than those illustrated in FIG. 3.

Generally, ping module 310 and trace module 320 may allow network device 110, acting as a source (or ingress node), to output one or more datagrams to test connectivity from the source network device to a target network device (or an egress node). Ping echo requests and trace echo requests may be collectively and generically referred to herein as "echo requests." Ping module 310 and trace module 320 may be implemented, for example, using processor 260 executing software. In some implementations, ping module 310 and trace module 320 may provide a user interface (not shown) to receive user commands and display diagnostic results. Ping module 310 may include processing logic to perform a connectivity check on an MPLS path from an ingress node to an egress node. Trace module 320 may include processing logic to perform hop-by-hop fault localization, as well as path tracing, of an MPLS path.

Both ping module 310 and trace module 320 may cause network device 110 to output echo request datagrams and receive echo reply datagrams. As described in more detail herein, the echo request datagrams may include, for example, instructions to network devices in the LSP path to send the echo request via a bypass path (such as an RSVP bypass tunnel) associated with a particular transit node. The echo requests may also include instructions for an egress node to send an echo reply datagram that indicates that the echo request was successfully received via the bypass path. In one implementation, instructions may be provided using an MPLS shim header (also referred to herein as an "MPLS header") that can be processed by transit router hardware in the forwarding plane.

Exemplary LSP Ping

Figure 4A:
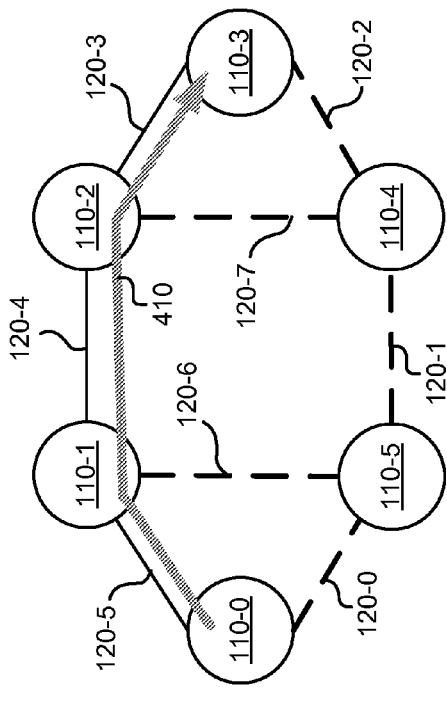
FIG. 4A is a diagram of an exemplary MPLS network using a LSP.
Figure 4B:
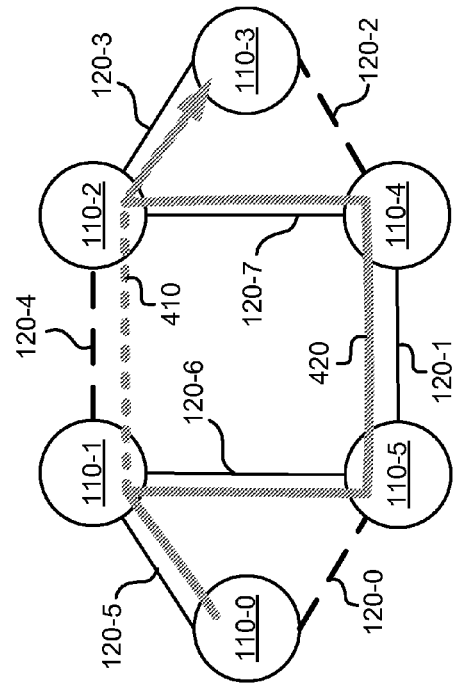
FIG. 4B is a diagram of an exemplary MPLS network using a RSVP bypass in the LSP of FIG. 4A.

FIGS. 4A and 4B provide diagrams of an exemplary MPLS network using a LSP. FIG. 4A provides an illustration of a primary LSP between an ingress node and an egress node. FIG. 4B provides an illustration of a bypass path for one of the links of the LSP of FIG. 4A.

Generally, an LSP ping uses MPLS echo request datagrams and MPLS echo reply datagrams to validate an LSP. The echo request datagram may be sent from an ingress node to an egress node of the LSP. The echo reply datagram may be sent from the egress node to the ingress node of the LSP. Referring to FIG. 4A, a network 400 may include LSP 410 having ingress node 110-0, transit nodes 110-1 and 110-2, and egress node 110-3 connected by links 120-5, 120-4, and 120-3. Assuming all aspects of LSP 410 are functioning properly, an echo request for an LSP ping or an LSP trace may transit sequentially from ingress node 110-0 over link 120-5 to transit node 110-1, from transit node 110-1 over link 120-4 to transit node 110-2, and from transit node 110-2 over link 120-3 to egress node 110-3.

Referring to FIG. 4B, if link 120-4 of network 400 fails, an LSP 420 that includes a bypass path, such as an RSVP bypass tunnel, may be used to avoid link 120-4. Assuming link 120-4 has failed, an echo request for an LSP ping or an LSP trace from node 110-1 to 110-3 may transit sequentially from ingress node 110-0 over link 120-5 to transit node 110-1, from transit node 110-1 over link 120-6 to transit node 110-5, from transit node 110-5 over link 120-1 to transit node 110-4, from transit node 110-4 over link 120-7 to transit node 110-2, and from transit node 110-2 over link 120-3 to egress node 110-3. However, separate instructions may be required to use an echo request to test bypass route 420 when link 120-4 is, in fact, operational, since the default nature of the MPLS protocol is to use the functional LSP links.

To allow an echo request to transit bypass route 420 when LSP 410 is operational, the echo request that is transmitted from node 110-0 may be configured to request a particular transit node (in this case transit node 110-1) to forward the echo request over bypass route 420 rather than the original LSP 410. In one implementation, the echo request datagram for bypass route 420 may include a modified MPLS header to instruct transit node 110-1 to use the bypass. In one implementation, the echo request forwarding by transit node 110-1 may be conducted in the forwarding plane. For example, the echo request datagram may be received and processed using an application-specific integrated circuit (ASIC) that reviews and processes header information in the datagram. In other implementations, the echo request forwarding may be conducted in the control plane or even the services plane of node 110-1. For example, the echo request datagram may be processed using processor(s) executing software.

The echo request from node 110-0 may also include instructions for egress node 110-3 to send an echo reply that indicates the echo request was successfully received over a LSP bypass route. The echo reply may be sent back to node 110-0 using any available protocol, including MPLS (such as LSP 410), Internet protocol (IP), or a combination of MPLS and IP.

While FIG. 4B shows one bypass tunnel for LSP 410 of FIG. 4A, network 400 may have multiple other bypasses that the LSP may traverse. Generally, each node in an LSP can have a bypass path. Thus, a comprehensive test of all the bypasses an LSP could traverse may require an echo request for each transit node bypass. In one implementation, a series of bypass echo requests may be sequentially performed at each transit node in an LSP.

Exemplary Echo Request Format

FIG. 5 provides a block diagram illustrating an exemplary datagram format for use in testing a bypass for the exemplary case of an RSVP LSP. The datagram format may include layer 2 header 510, MPLS bypass test header 520, MPLS echo request header 530, and IP packet 540.

Layer 2 header 510 may include destination information for the purpose of routing. For example, layer 2 header may include a source IP address, a destination IP address, a time to live (TTL) value that may indicate a maximum number of hops the datagram can traverse on the way to its destination, and/or other information.

MPLS bypass test header 520 may include a bypass test indication label 522, an experimental functions section 524, a stack functions section 526, and a time to live (TTL) section 528. Bypass test indication label 522 may provide an indication to a network device (such as network device 110) of the type of datagram that is being transmitted, namely that that the datagram is a bypass route echo request. Experimental functions section 524 may include experimental bits, such as queuing priority to specify, for example, precedence for the MPLS echo reply. Stack functions section 526 may indicate if a particular label is the last in a label stack.

TTL section 528 may indicate the number of hops MPLS bypass test header 520 may traverse in the LSP before initiating a bypass test. For example, as will be described in more detail herein, TTL section 528 may include a value that may be decreased incrementally as the datagram passes through each LSR in an LSP. When the value of TTL section 528 reaches 1 (for example), the LSR handling the datagram will know to act on the bypass test indication label 522.

MPLS echo request header 530 may include a similar format to that of MPLS bypass test header 520. MPLS echo request header 530 may include label information indicating what to do after MPLS bypass test header 520 expires (e.g., the TTL value of TTL section 528 reaches 0). For example, MPLS echo request header 530 may include a label (not shown) for a ping utility or a traceroute utility and a separate TTL value (not shown) for header 530. In one implementation, MPLS header 530 may be created (e.g., "pushed") by a transit node after the MPLS bypass test header 520 expires (e.g., "pops"). In another implementation, multiple MPLS headers may be generated by the ingress node that generates the echo request. IP packet 540 may contain instructions for the egress node or a transit node, including information indicating an RSVP bypass was being used for the echo request and that the echo reply should indicate that the receipt of the request came via a bypass.

Exemplary Process for LSP Bypass Test

FIG. 6 is a flowchart of an exemplary process 600 using a ping or traceroute utility to test a bypass for the exemplary case of an RSVP LSP. Process 600 may include, for example, an ingress node, one or more transit nodes, and an egress node, all of which may be network devices 110.

An echo request may be sent with instructions for a transit node to route the echo request via a bypass (block 610). For example, an ingress node (such as network device 110-0 of FIG. 4B) may send an echo request toward an egress node (such as network device 110-3 of FIG. 4B). The echo request may include a label (such as bypass test indication label 522), a transit node indicator (such as TTL 528), and/or other instructions indicating that a particular transit node should send the echo request via the RSVP bypass associated with that transit node.

The echo request may be forwarded via the RSVP bypass (block 620). For example, a particular transit node (such as network device 110-1 of FIG. 4B) in the LSP may receive the echo request from the ingress node, and identify the bypass label and transit node indicator. Assume that the transit node indicator has a TTL value of 1, indicating that the transit node should act on the instructions. Based on the instructions, the transit node may forward the echo request toward the egress node via an RSVP bypass that is associated with the first designated transit node. Forwarding operations by the transit node may occur, for example, in the forwarding plane or in the control plane. If there is no RSVP bypass associated with the first designated transit node, the transit node may forward the echo request over the original LSP.

The echo request may or may not successfully transit the RSVP bypass (block 630). For example, in the context of an LSP ping, transmission of the ping echo request may fail somewhere between the transit node that initiated transmission via the bypass route (in block 620) and the egress node (such as network device 110-3 of FIG. 4B). In the context of an LSP trace, transmission of the trace echo request may fail somewhere between the transit node that initiated transmission via the bypass route (in block 620) and the next hop along the RSVP bypass (such as network device 110-4 of FIG. 4B). If the echo request successfully transits (e.g., the ping echo request reaches the egress node or the trace echo request reaches the next hop node), the process will continue to block 640. If the echo request does not successfully transit (e.g., the ping echo request fails to reach the egress node or the trace echo request fails to reach the next hop node), the response period for reply will time out at the ingress node (e.g. an echo response is not received by the ingress node within a particular time period). In this case, bypass route associated with the transit node will be deemed failed.

A reply may be sent confirming that the echo request, sent via an RSVP bypass, was successfully received (block 640). For example, in the context of a ping echo request, the egress node may send an echo reply to the ingress node. In the context of a trace echo request, the next hop node may send an echo reply to the ingress node. The echo reply may be sent as an IP packet and forwarded using IP, MPLS or a combination of both. Based on instructions in the echo request, the echo reply may contain information to indicate that the echo request was received via an RSVP bypass.

The echo reply may be received (block 650). For example, the original ingress node (e.g., network device 110-1) may receive the echo reply with information indicating that the echo request was successfully received by the egress nose. Thus, in the context of an LSP ping, the test of the RSVP bypass for the first designated transit node would be deemed successful. In the context of an LSP trace, the test of the RSVP bypass for the first designated transit node would be deemed successful up through the first node in the bypass path. Subsequent trace echo requests may pass through the same transit node in block 650 to complete the trace through the entire RSVP bypass path.

It may be determined if any more transit nodes remain to be tested (block 660). For example, the ingress node may evaluate the echo reply from the previous echo request to determine if all of the transit nodes in the LSP have been tested. For example, if the bypass label for the echo request has not expired before reaching the egress node, the egress node may indicate that there are no more transit nodes in the LSP. If no other transit nodes remain to be tested and a successful echo reply was received from each echo request, all RSVP bypasses for the tested LSP may be deemed valid. If more transit nodes remain to be tested, the process may proceed to block 670.

The transit node indicator count may be increased for the next echo request (block 670). For example, the ingress node may incrementally increase the TTL count for the transit node indicator in the MPLS bypass test header (e.g., TTL 528 of FIG. 5) to send an echo request through the RSVP bypass of the next transit node in the LSP sequence. The ingress node may continue to send echo requests until the bypass paths of all transit nodes have been tested.

Exemplary Transit Node Process for LSP Bypass Test

FIG. 7 is a flowchart of an exemplary transit node process 700 for using a ping or traceroute utility to test a bypass for an RSVP LSP. Process 700 may be accomplished, for example, by a transit node or an egress node, such as an LSR.

A bypass test request may be received (block 710). For example, a transit node (such as network element 110-1 of FIG. 3) may receive an MPLS echo request from an ingress node or another transit node. The echo request may be a datagram that includes an MPLS header for a bypass (such as MPLS bypass test header 520 of FIG. 5) and an MPLS header for a trace or ping (such as MPLS echo request header 530).

The TTL value of the bypass header may be examined (block 720). For example, the transit node may review the TTL of the bypass header of the datagram to determine if processing is required (that is, for example, if the TTL for the bypass header equals one). If the TTL for the bypass header does not equal 1 in block 720, then the process may proceed to block 730.

The bypass TTL may be decremented and the echo request forwarded (block 730). For example, the transit node may decrement the TTL value by one number and forward the echo request to the next node in the LSP.

If the TTL for the bypass header equals one in block 720, then the process may proceed to block 740. The bypass instructions may be processed (block 740). For example, the transit node may route the echo request to the RSVP bypass path designated for that node, pop the bypass header, and forward the echo request to the next node along the LSP bypass.

The TTL value of the echo request header and the LSP destination may be examined (block 750). For example, the transit node may review the TTL of the echo request header to determine if processing is required, that is (for example), if the TTL for the echo request header equals one. Also, the transit node may review the LSP destination to determine if the echo request has reached the end of the LSP.

If the TTL for the echo request header does not equal 1 in block 750 or the end of the LSP has not been reached, then the process may proceed to block 760. The echo request TTL may be decremented and the echo request forwarded (block 760). For example, the transit node may decrement the TTL value by one number and forward the echo request to the next node in the LSP.

If the TTL for the echo request header equals 1 or if the end of the LSP has been reached in block 750, then the process may proceed to block 770. The echo request may be processed (block 770). For example, in the context of an LSP trace and consistent with MPLS traceroute protocol, the transit node may find a downstream mapping for the LSP and include its own downstream mapping based on the incoming label. The transit node may forward a trace echo reply to the ingress node that includes mapping information. In the context of an LSP ping, the transit node may forward the datagram along the bypass path toward the egress node.

CONCLUSION

Implementations described herein may test RSVP bypass tunnels for an LSP in a multiprotocol label switching (MPLS) network. LSP ping and LSP trace mechanisms may be used at each transit node along the LSP. Certain implementations utilizing an LSP ping utility may allow for testing of failure actions of transit nodes and bypass paths. Also, merge actions by transit nodes at the end of the bypass tunnel may also be tested.

Other implementations utilizing an LSP traceroute utility may allow for isolation of a point-of-failure, if, for example, an LSP traceroute echo request along an RSVP bypass fails. Furthermore, implementations described herein may provide a single traceroute process for end-to-end LSP troubleshooting, in contrast with multi-step troubleshooting. Also, implementations described herein may enable an LSP ingress node to build a complete map of paths taken by bypass LSPs and use that information for intelligent re-routing and re-optimization.

The foregoing description of exemplary implementations provides illustration and description, but is not intended to be exhaustive or to limit the invention to the precise form disclosed. Modifications and variations are possible in light of the above teachings or may be acquired from practice of the invention.

For example, while RSVP protocol has been used to as an exemplary protocol for use with the systems and methods described herein, in other implementations a bypass path can be signaled using another protocol. As another example, datagram processing and forwarding actions described herein may be implemented in hardware, firmware, or some combination of hardware and software. For example, various portions of network device 110 may be implemented in application-specific integrated circuits (ASICs). The ASICs may be configured to perform some processing via dedicated logic, and may also be configured to perform some processing using microcode instructions that may be stored in memory. In other implementations, network device 110 may be practiced using a variety of hardware configurations in addition to, or instead of, ASICs. For example, some combination of general purpose processors, digital signal processors (DSPs), and/or programmable gate arrays (PGAs) may also be utilized to implement the functionality described herein.

In addition, while series of blocks have been described with respect to FIGS. 6 and 7, the order of the blocks may be varied in other implementations. Moreover, non-dependent blocks may be implemented in parallel.

Further, certain portions of the invention may be implemented as "logic" that performs one or more functions. This logic may include firmware, hardware, such as a processor, a microprocessor, an ASIC, or a field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by a network device serving as an ingress node for a functioning label switch path (LSP), the method comprising:
    assembling a multiprotocol label switching (MPLS) echo request, the echo request including:
        an instruction to a transit node in the functioning LSP to forward the echo request via a bypass path, associated with the transit node, that provides a failure mechanism across at least one of a protected link or a protected node in the functioning LSP, and
        an instruction for an egress node in the functioning LSP to send an echo reply indicating that the echo request was received on the bypass path associated with the transit node; and
    sending the MPLS echo request over the functioning LSP.

2. The method of claim 1, where the instructions to the transit node include:
    path information, and
    a indicator to the transit node to forward the request along a Resource Reservation Protocol (RSVP) bypass path.

3. The method of claim 2, where the transit node indicator includes a MPLS label with a time to live (TTL) field that is used to deliver the MPLS echo request to a particular transit node.

4. The method of claim 1, further comprising:
    receiving the echo reply from the egress node, where the echo reply includes an indication that the echo request was received via the bypass path associated with the transit node.

5. The method of claim 1, further comprising:
    sending a subsequent MPLS echo request over the functioning LSP, the subsequent echo request including:
        an instruction for another transit node in the LSP to send the subsequent echo request via another bypass path associated with the other transit node, that provides a failure mechanism across at least one other protected link or other protected node in the functioning LSP; and
        an instruction for the egress node to send another echo reply indicating that the subsequent echo request was received via the other bypass path associated with the other transit node.

6. The method of claim 1, where the echo request is a MPLS ping.

7. The method of claim 1, where the echo request is a MPLS trace.

8. A network device comprising:
    a control unit to assemble multiprotocol label switching (MPLS) echo requests, each of the echo requests including an instruction for a separate transit node in a functional label switched path (LSP) to send the echo request via a bypass path associated with the transit node and an instruction for an egress node to send an echo reply that indicates that the echo request was received via the bypass path; and
    an output port to send the echo requests over the LSP.

9. The network device of claim 8, where the network device comprises:
    a router, a switch, a firewall device, or a server device.

10. The network device of claim 8, where the instructions for the separate transit node include:
    path information, and
    an indicator to the transit node to forward the request along the bypass path.

11. The network device of claim 8, where the transit node indicator includes a MPLS label with a time to live (TTL) field that is used to deliver the MPLS echo request to a particular transit node.

12. The network device of claim 8, further comprising:
    an input port to receive the echo reply from the egress node.

13. The network device of claim 8, where the bypass path is a resource reservation protocol (RSVP) bypass tunnel.

14. The network device of claim 8, where the echo request is a MPLS ping.

15. The network device of claim 8, where the echo request is a MPLS trace.

16. A method performed by a network device serving as a transit node for a functioning label switch path (LSP), the method comprising:
    receiving, from an ingress node, a multiprotocol label switching (MPLS) echo request including an instruction to forward the echo request via a bypass path associated with the transit node of the functioning LSP;
    evaluating a MPLS header in the echo request to determine if the instruction to send the echo request via the bypass path is intended for the network device; and
    forwarding the echo request via the bypass path associated with the network device when the instruction to send the echo request via the bypass path is intended for the network device.

17. The method of claim 16, where the receiving, evaluating, and forwarding are conducted on an application-specific integrated circuit (ASIC).

18. The method of claim 16, where the echo request is one of a MPLS ping or a MPLS trace.

19. A computer-readable medium storing instructions executable by one or more processors, the medium storing one or more instructions for:
    receiving a packet from an ingress node over a functioning label switched path (LSP), the packet including an echo request;
    evaluating a multiprotocol label switching (MPLS) header in the echo request to determine if the echo request includes instructions intended for a network device;
    forwarding the echo request via a bypass path associated with the network device when the instruction to send the echo request via the bypass path is intended for the network device; and
    sending an echo reply to the ingress node, the reply indicating that the packet including the echo request was received via the bypass path.

20. A method comprising:
    assembling, by an ingress node, a multiprotocol label switching (MPLS) echo request, the echo request including an instruction for a transit node to send the echo request via a bypass path associated with the transit node, and an instruction for an egress node to send an echo reply;

sending, by the ingress node, the MPLS echo request over a functioning label switched path (LSP);
receiving the MPLS echo request at a transit node along the functioning LSP;
evaluating, by the transit node, the MPLS echo request to determine if the instruction to send the MPLS echo request via the bypass path is intended for the transit node;
forwarding, by the transit node, the MPLS echo request via the bypass path associated with the transit node when the instruction to send the echo request via the bypass path is intended for the transit node;
receiving the MPLS echo request at the egress node; and
sending, by the egress node, an echo reply to the ingress node based on the MPLS echo request.

21. A method comprising:
assembling, by an ingress node of a functioning label switched path (LSP), multiple multiprotocol label switching (MPLS) echo requests, each echo request intended for a different transit node, each of the MPLS echo requests including an instruction for the transit node to send the echo request via a bypass path associated with the transit node and an instruction for an egress node to send an echo reply; and
sending the MPLS echo request over the LSP.

22. The method of claim 21, where each of the MPLS echo requests includes a MPLS label with a time to live (TTL) field that is used to deliver the MPLS echo request to a particular transit node.

\* \* \* \* \*